United States Patent Office 3,030,551
Patented Apr. 17, 1962

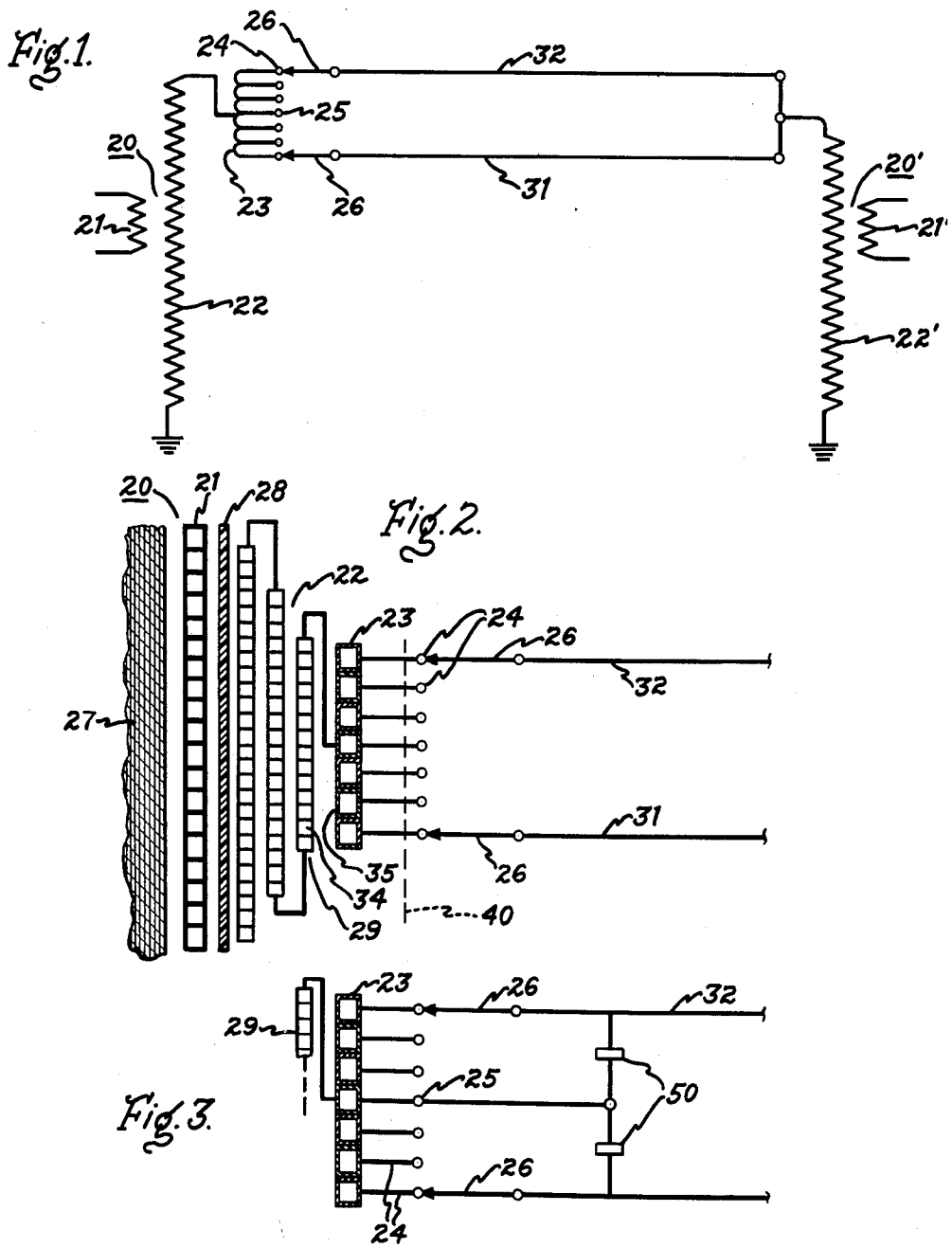

3,030,551
ELECTRICAL APPARATUS
Salvatore Minneci, Pittsfield, Mass., assignor to General Electric Company, a corporation of New York
Filed Dec. 5, 1960, Ser. No. 73,854
8 Claims. (Cl. 317—14)

This invention relates to electrical apparatus and more in particular to improved means capable of protecting apparatus connected to power transmission lines from voltage surges while preventing formation of ice on such lines.

In the power transmission art it is well known to prevent the formation of ice on power transmission lines suspended in air by producing a circulating current in the lines for heating them. This is generally accomplished by providing connections on the transmission lines for causing adjacent lines to be at different electrical potentials.

It is also known to provide power transmission equipment, such as transformers and the like, with means for protecting the equipment from abnormal voltage surges, such as those caused when lightning strikes a power transmission line connected to the equipment. One common method of protecting such equipment from voltage surges is to provide various types of electrostatic shields adjacent the line end of the windings. The shields can be designed to cause substantially uniform distribution of steep wave fronts through the windings by altering the capacitance of the winding to ground and the capacitance from turn-to-turn and from winding-to-winding.

Although solutions to the two problems mentioned above have been obtained from prior art practices, power transmission apparatus has become increasingly bulky and costly as a result of these practices. One of the reasons for this undesirable result is that separate means have been employed for shielding the apparatus and for providing the potential difference between transmission lines for heating them.

Accordingly, it is an object of this invention to provide improved electrical power transmission apparatus.

Another object of this invention is to provide improved means for producing a potential difference in electrical power transmission lines that prevents icing by causing a circulating current to flow through the lines.

Another object of this invention is to provide improved means for shielding a winding on electrical apparatus from abnormal voltage surges.

A still further object of the invention is to provide means that simultaneously shields a winding on electrical apparatus from abnormal voltage surges while providing a circulating heating current through transmission lines connected to the apparatus.

Other objects and advantages of the invention will be apparent from specification, drawing, and claims, and the scope of the invention will be pointed out in the claims.

Briefly stated, according to one aspect of my invention a power producing winding in electrical apparatus can be shielded by means of an auxiliary voltage-producing winding located between the power producing winding and a ground plane. The auxiliary winding may be substantially coextensive with a portion of the power producing winding at the line-end, and the power producing winding may be connected to a center tap connection of the auxiliary winding. The auxiliary winding may be employed to produce a potential difference between transmission lines connected to the apparatus for causing a circulating current to flow in the transmission lines and heat them to prevent icing.

In the drawing:

FIGURE 1 is a circuit diagram of an embodiment of my invention.

FIGURE 2 is a partially cross-sectional schematic representation of a transformer in accord with the teachings of my invention.

FIGURE 3 is a modification of FIGURE 2.

The invention will now be explained in greater detail by reference to the drawing. FIGURE 1 illustrates the circuit for one phase of a polyphase power transmission system employing my invention. A step-up power transformer 20 may have its primary winding 21 connected to a generator or other source of voltage (not illustrated). The secondary winding 22 of the step-up transformer 20 may be connected to a plurality of bundled power transmission line conductors 31 and 32 by means of an auxiliary voltage-producing winding 23. The winding 23 may have a plurality of tap connections 24 for producing a potential difference between the conductors 31 and 32, and the winding 22 may be connected to a center tap 25. The transmission line conductors 31 and 32 may be connected to the auxiliary winding 23 at various locations by means of tap changing switches 26. The other end of the conductors 31 and 32 may be connected to a step-down transformer 20' having a primary winding 22' electrically coupled to a secondary winding 21', which may be connected to a load (not illustrated). The transmission line conductors 31 and 32 may be any of the conventionally employed types, but preferably each phase has a multiple strand arrangement electrically isolated conductors.

When it is desired to produce a circulating current in the conductors 31 and 32 for heating them to prevent icing, it is merely necessary to connect the conductors to the transformer winding 22 through the auxiliary winding 23 at different tap locations, as illustrated in FIGURE 1. This will cause a potential difference to exist between the conductors 31 and 32 because the portion of the winding 23 on one side of the central tap 25 will boost the voltage produced by the winding 22 and the portion of the winding 23 on the other side of the tap 25 will produce a voltage that bucks the voltage from the winding 22. When no circulating current is needed, the lines 31 and 32 may be maintained at the same potential merely by connecting the switches 26 to the same tap in the winding 23. The magnitude of the circulating current and the voltage of the lines 31 and 32 may be varied by varying the taps in the winding 23 to which the switches 26 are connected.

The circuit for producing circulating current in transmission lines described above is advantageous when tests are being conducted on the power transmission lines. The use of the tapped auxiliary winding 23 allows the lines 31 and 32 to be maintained at equal potentials both above and below the rated line-to-line potential; this results in a more uniform distribution of capacitance charging currents in the lines. Thus when tests are made for corona loss or radio noise, it is easy to calibrate the data obtained because of the controlled potential difference.

FIGURE 2 illustrates the relationship between the windings 23 and 22 that enables the winding 23 to shield the winding 22 from abnormal, steep wave front voltage surges. In FIGURE 2 the transformer 20 is illustrated as having a magnetic core 27 which may be circumscribed by the low voltage winding 21. The low voltage winding 21 is circumscribed by the high voltage winding 22, and the windings 21 and 22 may be separated by conventional insulating means 28. The high voltage winding 22 is illustrated as a layer-type winding that is formed by spirally winding an insulated conductor axially of the core 27. The winding 22 has an endmost group of turns 29 at the line-end which is connected to the center tap 25 of the auxiliary winding 23. The winding 22 is formed from a conductor 34 having a predetermined size capable of carrying the power produced by the transformer 20, and the conductor 34 is insulated in a predetermined manner to satisfy the power industry standards for transformers of its rated power capacity.

The auxiliary winding 23 is formed by circumscribing the layer of turns 29 with an insulated conductor 35. The winding 23 may be made from a larger-sized more heavily insulated conductor than the winding 22 so that it can carry larger currents without overheating. Also this will enable the relatively small number of turns in the winding 23 needed to produce the relatively small potential difference between the conductors 31 and 32 to be substantially coextensive with the layer of turns 29 in order to adequately shield same.

It is well known that the initial potential distribution in a transformer winding when a steep wave front, such as a lightning stroke, appears at one terminal is determined by the ratio of the capacitance of the winding coils to ground with respect to the mutual capacitance and the conductor turns. Electrostatic shields are commonly employed in order to prevent a breakdown of insulation by adjusting the capacitance ratio favorably to provide a more nearly equal voltage distribution in the winding. It will be appreciated from FIG. 2 that the auxiliary winding 23 will have the effect of an electrostatic shield that distributes steep wave front surges because of its location between the outer layer of turns 29 and a ground plane 40, which for example could be an enclosure tank surrounding the transformer 20. For example, if lightning strikes the lines 31 and 32, the steep wave fronts will travel therealong until they reach opposite ends the winding 23. Then the waves from the lines 31 and 32 will travel in opposite directions through the winding 23 toward the center tap 25. The retarding effect of inductance produced by the voltage surge will be substantially eliminated in the winding 23 because the flux produced by the waves travelling in opposite directions will cancel each other. Thus when the surge reaches the center tap 25 and from there travels to the winding 22, the turns in the winding 23 will all be at essentially the same potential. This will result in the high potential wave front being distributed along substantially the entire length of the layer of turns 29. This will increase the capacitance of the layer 29 to ground and thus reduce the tendency of a steep wave front to pile up at the line-end of the winding 22.

FIGURE 3 shows another embodiment of the invention which is identical to that shown in FIGURE 2, except that resistance elements 50 have been connected to the center tap 25 of the winding 23 in order to shunt the other turns of the winding 23. The resistance elements 50 are of the type that decrease non-linearly in resistance as voltage increases and may, for example, be made from the material sold under the trademark "Thyrite." The effect of the resistance elements 50 would be to cause an abnormal voltage impulse to travel through the elements 50 directly to the center tap 25, and thus shunt out the other turns in the winding 23. This would permit the winding 23 to be less heavily insulated than if the shunting resistors 50 were not employed because the voltage distribution would be more uniform in the winding 23.

It has been shown by practicing my invention, an auxiliary winding which produces a useful voltage for some auxiliary purpose may be employed to shield the power producing winding of power transmission apparatus from voltage surges. This enables the cost and size of such apparatus to be reduced because the electrostatic shields normally employed for impulse voltage distribution can be eliminated. Although the auxiliary winding shown in the drawing was employed for heating a power transmission line to prevent icing, it will be appreciated by those skilled in the art that other types of auxiliary windings may be used to serve a dual function according to my teachings.

It will be understood, of course, that while the forms of the invention herein shown and described constitute preferred embodiments of the invention, it is not intended herein to illustrate all of the equivalent forms or ramifications thereof. For example, although the winding 22 on the transformer 20 has been illustrated as the layer-type, it will be appreciated that my invention can also be practiced on windings of the disc or pancake type. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. In electrical apparatus, the combination comprising a power producing winding having a group of aligned insulated conductor turns at its line-end adjacent a ground plane, and the improvement in means for shielding said power producing winding from voltage surges comprising an auxiliary voltage producing winding between said power producing winding and said ground plane, a lead from said group of aligned turns being electrically connected to a center tap connection in said auxiliary winding, and said auxiliary winding being adjacent and substantially coextensive with said group of aligned turns.

2. In a transformer, the combination comprising a high voltage winding having a group of aligned insulated conductor turns at its line-end adjacent a ground plane, said aligned turns having a predetermined dimension, and the improvement in means for shielding said high voltage winding from voltage surges comprising an auxiliary voltage producing winding between said high voltage winding and said ground plane, a lead serially connecting the line-end of said group of aligned turns to a center tap connection in said auxiliary winding, said auxiliary winding being adjacent and substantially coextensive with said group of aligned turns, and said auxiliary winding comprising a coiled conductor having dimensions larger than the predetermined dimensions of said aligned turns.

3. In a transformer, the combination comprising a high voltage winding having a group of aligned insulated conductor turns at its line-end adjacent a ground plane, and the improvement in means for shielding said high voltage winding from voltage surges comprising an auxiliary voltage producing winding between said high voltage winding and said ground plane, a lead serially connecting the line-end of said group of aligned turns to a center tap connection in said auxiliary winding, said auxiliary winding being adjacent and substantially coextensive with said group of aligned turns, and means having resistance that varies inversely with voltage connected to said center tap connection for shunting the remaining turns of said auxiliary winding during voltage surges.

4. In a transformer, the combination comprising a high voltage winding having a group of aligned insulated conductor turns at its line-end adjacent a ground plane, said aligned turns and their insulation having predetermined dimensions, and the improvement in means for shielding said high voltage winding from voltage surges comprising an auxiliary voltage producing winding between said high voltage winding and said ground plane, a lead serially connecting the line-end of said group of aligned turns to a center tap connection in said auxiliary winding, said auxiliary winding being adjacent and substantially coextensive with said group of aligned turns, said auxiliary winding comprising a coiled conductor having dimensions larger than the predetermined dimensions of said aligned turns, and means having resistance that varies inversely with voltage connected to said center tap connection for shunting the remaining turns of said auxiliary winding during voltage surges.

5. In a high voltage power transmission system of the type having a transformer connected to electrically isolated multiple-conductors suspended in open air, the improvement in means for providing a circulating current in said conductors for heating same to melt ice comprising an auxiliary winding connected to a high voltage winding in said transformer, said auxiliary winding being tapped at a plurality of locations, said high voltage winding being connected to a center tap of said auxiliary winding, means for connecting said conductors to different taps on said auxiliary winding to produce a potential difference therebetween, and the location of said auxiliary winding with respect to said high voltage winding being such that said auxiliary winding acts as an impulse distributing shield for said high voltage winding during voltage surges.

6. In a high voltage power transmission system of the type having a transformer connected to electrically isolated multiple-conductors suspended in open air, the improvement in means for providing a circulating current in said conductors for heating same to melt ice comprising a tapped auxiliary winding connected to a high voltage winding in said transformer, said high voltage winding being serially connected to a center tap in said auxiliary winding, tap changing switches for connecting said conductors to different taps on said auxiliary winding to produce a potential difference therebetween, and said auxiliary winding being located between said high voltage winding and a ground plane, whereby said auxiliary winding acts as an impulse distributing shield for said high voltage winding during voltage surges.

7. In a high voltage power transmission system of the type having a transformer connected to electrically isolated multiple-conductors suspended in open air, the improvement in means for providing a circulating current in said conductors for heating same to melt ice comprising a tapped auxiliary winding connected to a high voltage winding in said transformer, said high voltage winding having an outer group of aligned turns at its line-end adjacent a ground plane, said group of aligned turns being serially connected to a center tap in said auxiliary winding, switch means for connecting said conductors to different taps on said auxiliary winding to produce a potential difference therebetween, said auxiliary winding being substantially coextensive with said group of aligned turns and being located between said group and said ground plane, and means having resistance that varies inversely with voltage connected to said center tap for shunting the remaining turns of said auxiliary winding during voltage surges, whereby said auxiliary winding acts as an impulse distributing shield for said high voltage winding during voltage surges.

8. In a high voltage power transmission system of the type having a transformer connected to electrically isolated multiple-conductors suspended in open air, the improvement in means for providing a circulating current in said conductors for heating same to melt ice comprising a tapped auxiliary winding connected to a high voltage winding in said transformer, said high voltage winding having an outer group of aligned turns at its line-end adjacent a ground plane, said group of aligned turns being serially connected to a center tap in said auxiliary winding, switch means for connecting said conductors to different taps on said auxiliary winding to produce a potential difference therebetween, said auxiliary winding comprising a conductor more heavily insulated and larger in size than that of said group of aligned turns, said auxiliary winding being substantially coextensive with said group of aligned turns and being located between said group and said ground plane, and means having resistance that varies inversely with voltage connected to said center tap for shunting the remaining turns of said auxiilary winding during voltage surges, whereby said auxiliary winding acts as an impulse distributing shield for said high voltage winding during voltage surges.

References Cited in the file of this patent
UNITED STATES PATENTS

| | | |
|---|---|---|
| 1,814,684 | Gay | July 14, 1931 |
| 2,276,855 | Meador | Mar. 17, 1942 |
| 2,497,699 | Sutherland | Feb. 14, 1950 |
| 2,534,935 | Wagner | Dec. 19, 1950 |